US 6,560,652 B1

(12) United States Patent
Larson et al.

(10) Patent No.: US 6,560,652 B1
(45) Date of Patent: May 6, 2003

(54) METHOD AND APPARATUS FOR ACCESSING VARIABLE SIZED BLOCKS OF DATA

(75) Inventors: David N. Larson, Austin, TX (US); Jagannathan Bharath, Eldorado Hills, CA (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/196,537

(22) Filed: Nov. 20, 1998

(51) Int. Cl.[7] .............................................. G06F 15/16
(52) U.S. Cl. ........................... 709/232; 710/56; 710/22
(58) Field of Search ................................ 709/232, 260, 709/215, 212, 213, 214, 216; 370/229; 395/444; 710/25, 22, 56; 364/200

(56) References Cited

U.S. PATENT DOCUMENTS

| 4,348,720 A | * | 9/1982 | Blahut et al. ................ 364/200 |
| 4,471,427 A | * | 9/1984 | Harris ......................... 364/200 |
| 5,584,010 A | * | 12/1996 | Kawai et al. ................ 395/444 |
| 5,794,069 A | * | 8/1998 | Chisholm et al. .............. 710/2 |
| 5,797,033 A | * | 8/1998 | Ecclesine .................... 395/842 |
| 6,088,346 A | * | 7/2000 | Du et al. ..................... 370/338 |
| 6,119,176 A | * | 9/2000 | Maruyama ................... 710/25 |
| 6,151,642 A | * | 11/2000 | Nakano ....................... 710/22 |

* cited by examiner

*Primary Examiner*—Dung C. Dinh
*Assistant Examiner*—Kimberly Flynn
(74) *Attorney, Agent, or Firm*—Williams, Morgan & Amerson, P.C.

(57) ABSTRACT

A method and apparatus are provided for accessing data. The method includes defining a first portion of a memory for receiving data and providing a memory request to transfer data from a source to the first portion of the memory defined to receive the data. The method further includes transferring a portion of data from the source to the first portion of the memory, wherein the size of the portion of the data substantially corresponds to the size of the first portion of the memory.

21 Claims, 10 Drawing Sheets

| Mask | Load | Update | | S= |
|---|---|---|---|---|
| 0 | 0 | 1 | INIT | 1 |
| 0 | 1 | 1 | DMA | 2 |
| 0 | 1 | 0 | XMIT | 3 |
| 0 | 0 | 0 | ACK | 4 |
| 0 | 1 | 1 | DMA | 5 |
| 0 | 1 | 0 | XMIT | 6 |
| 0 | 1 | 0 | ACK | 7 |
| 0 | 1 | 0 | DMA | 8 |
| 0 | 1 | 0 | XMIT | 9 |
| 0 | 0 | 0 | ACK | 10 |
| 1 | 0 | 1 | SETUP | 11 |
| 0 | 0 | 1 | SETUP | 12 |

FIGURE 10

METHOD AND APPARATUS FOR ACCESSING VARIABLE SIZED BLOCKS OF DATA

BACKGROUND OF THE INVENTION

1. Field of the Invention

This invention relates generally to accessing data, and, more particularly, to accessing variable sized blocks of data.

2. Description of the Related Art

Modern day electronic products, such as computers and telecommunications devices, are generally faster and more efficient than their predecessors. One important factor that has contributed to the improved performance of today's electronic products is the efficiency at which these products access and process information. For example, microprocessors routinely transfer most often accessed information from external memories to on-chip memory caches to improve the overall performance of computers.

The ability to quickly access information can be a desirable feature in many applications, ranging from data processing systems to real-time applications capable of supporting data communications. This is particularly true for real-time communication applications that require a CPU to support complex communication protocols while simultaneously managing the transfer of large amounts of data, such as that required for the Internet. In data processing systems, as mentioned above, the overall system performance may be improved with a microprocessor's ability to more quickly and efficiently retrieve data or instructions for processing. The overall performance of real-time applications capable of supporting data communications can likewise be improved by utilizing a method of efficiently accessing information. One such example of a real-time communications applications where an efficient method of accessing information may be useful is a Wireless Local Loop (WLL) network. Those skilled in the art will appreciate that the method of quickly and efficiently accessing data is discussed with respect to WLL technology for illustrative purposes only, although the discussion may be equally pertinent with respect to other technologies as well.

Wireless Local Loop is quickly emerging as the technology that promises to deliver telephone service in geographical areas where using conventional copper telephone lines is cost prohibitive, or in the case where the line exists, radio access technologies, such as WLL, provide other companies an opportunity to provide competitive services. Installing the last quarter of a mile of the telephone wire to a subscriber station is usually one of the most costly portions of the traditional telephone network, primarily because of the expenses associated with labor and maintenance. The telephone companies, which are usually responsible for maintaining the telephone wire, are frequently plagued with the daunting task of repairing the damage to the telephone lines caused by inclement weather, falling trees, digging, and by the recurring problem of copper wire theft. Accordingly, to circumvent the problems that are typically associated with the "traditional" telephone network, system designers turned to WLL technology, which is proving to be a promising and viable alternative.

FIG. 1 illustrates a block diagram of a WLL network 100. The WLL network 100 includes a Wireless Subscriber Unit (WSU) 110 at the subscriber station 115 that communicates with a remote Basestation Transceiver System (BTS) 120. The data flow from the WSU 110 to the BTS 120 is referred to as an uplink connection, and the data flow from the BTS 120 to the WSU 110 is referred to as a downlink connection. The BTS 120 links the WSU 110 to a central office 130, thus allowing a user at the subscriber station 115 to communicate with other subscriber stations (not shown) through the central office 130. A connection 132 between the BTS 120 and the central office 130 may be made via a wire-line, fiber or microwave link, depending on the bandwidth, distance, and the terrain.

The heart of the WLL network 100 is the "wireless" interface between the BTS 120 and the WSU 110, where the need for the copper loop is eliminated. The WSU 110, located in the home or office, provides a radio frequency (RF) interface to an existing phone 135 or modem 140, usually through an RJ-11 type plug (not shown). The connection between the subscriber station 115 and the central office 130 is typically as reliable and clear as the copper wire version.

The counterpart to the WSU 110 is the BTS 120, which is generally located in the field. As is common in most wireless systems, the BTS 120 serves as a control station for the WSU 110 by providing, over a designated pilot channel, synchronization and control information necessary to initiate and maintain two-way communication. In communication systems employing time division multiple access (TDMA), a process well-known in the art, the WSU 110 selects the channel frequency and the specific time slot based upon the availability and quality of the channels in the coverage area.

Most wireless communication systems, including the WLL network 100, operate in accordance with the industry defined standards. For example, two popular standards for the WLL network 100 are Personal Handyphone System (PHS) and Digital Enhanced Cordless Telephone (DECT). The PHS and DECT standards, as well as other WLL standards, define the format for transmitting and receiving data, error checking algorithm, retransmission scheme, and other such parameters that are relevant to wireless communications systems.

The DECT standard for the WLL network 100, for example, defines a 10-millisecond frame that comprises twenty-four slots, generally twelve are reserved for transmitting and twelve for receiving. DECT supports voice, analog data (modem), and packet data communications. Voice and analog data communications are full duplex whereas packet data communications are simplex in nature. Packet data communications can take advantage of directing all slots in one direction, uplink or downlink, with the exception of one slot for the reverse acknowledgement channel. Depending upon the bandwidth allocated by the system, an uplink or downlink channel can utilize between one and twenty-three slots for transferring packet data. When no data is waiting to be sent, the bandwidth is deallocated and assigned to other users. Thus, in a downlink connection, the BTS 120 of the WLL network 100 can transmit data on up to twenty-three time slots that are allocated for transmitting data per each frame to the WSU 110. Assuming all of the data is successfully transmitted over the twenty-three time slots, then new data may be transmitted on the twenty-three transmit time slots of the next frame. On the other hand, if not all of the data is successfully transmitted to the BTS 120 because of transmission errors, then that data, along with new data, is retransmitted over the twenty-three transmit time slots in accordance with the DECT retransmission scheme.

Wireless communications systems implement standard procedures to improve the BER (Bit Error Rate) across the radio channel. These procedures include error detection and correction algorithms and error detection and retransmission algorithms. DECT provides an error detection and retransmission scheme to support packet data in WLL applications. The retransmission scheme of a DECT WLL network, for example, requires an acknowledgment to be generated by the peer station on a slot by slot basis. The BTS 120 or the WSU 110 may be the peer station, depending on whether the connection is an uplink or downlink connection. That is, in an uplink connection, the BTS 120 is the peer station, and in a downlink connection, the WSU 110 is the peer station. A "good" acknowledgement from the peer device indicates a good transmission. On the other hand, a "bad" acknowledgement indicates a bad transmission, and thus requires retransmission of data that was not received correctly by the peer station.

Generally, in the WSU 110 or the BTS 120 of the WLL network 100, data is retrieved from an external source (not shown), such as a processor or memory, before the data is transferred to the peer station. Because the data is transmitted and received at a fast rate between the BTS 120 and the WSU 110, it is desirable to quickly access the data for transmission from the external source (not shown). However, because the data carried by some slots may not successfully reach the BTS 120 during the first attempt, it may be necessary to retransmit unacknowledged slots until the data successfully reaches the BTS 120. Accordingly, some retransmission schemes may require different sized blocks of data to be retrieved from the external source for each frame transmission. Thus, the amount of data that is retrieved for transmission of the next frame may depend on the successful transmission rate of the previous frame since new data is generally retrieved for only those slots for which the transmission successfully completes.

The conventional method of retrieving data entails having a microprocessor or a microcontroller (not shown) program or instruct a direct memory access controller (not shown) to fetch the desired data. To retrieve different sized blocks of data for each transmission, the microprocessor/microcontroller, using the conventional method, must reprogram the direct memory access controller for each memory access. Reprogramming the direct memory access controller to fetch different size blocks of data for each memory access, however, is a time-consuming process that can adversely affect the performance of the communications system.

The present invention is directed to overcoming, or at least reducing the effects of, one or more of the problems set forth above.

SUMMARY OF THE INVENTION

In one aspect of the present invention, a method is provided for accessing data. The method includes defining a first portion of a memory for receiving data and providing a memory request to transfer data from a source to the first portion of the memory defined to receive the data. The method further includes transferring a portion of data from the source to the first portion of the memory, wherein the size of the portion of the data substantially corresponds to the size of the first portion of the memory.

In another aspect of the present invention, an apparatus is provided for accessing data. The apparatus includes a source for providing data, and a memory having a first portion configured to receive the data from the source. The apparatus comprises an access controller that is capable of transferring data from the source to the first portion of the memory in response to a memory request. The apparatus includes a control logic capable of determining the size of the first portion of the memory and capable of providing the memory access request to the access controller to transfer a portion of the data from the source corresponding to the size of the first portion of the memory.

BRIEF DESCRIPTION OF THE DRAWINGS

The invention may be understood by reference to the following description taken in conjunction with the accompanying drawings, in which like reference numerals identify like elements, and in which:

FIG. 10 illustrates an exemplary sequence of operation of the control bits utilized in the Wireless Subscriber Unit of FIG. 6.

Figure 1:
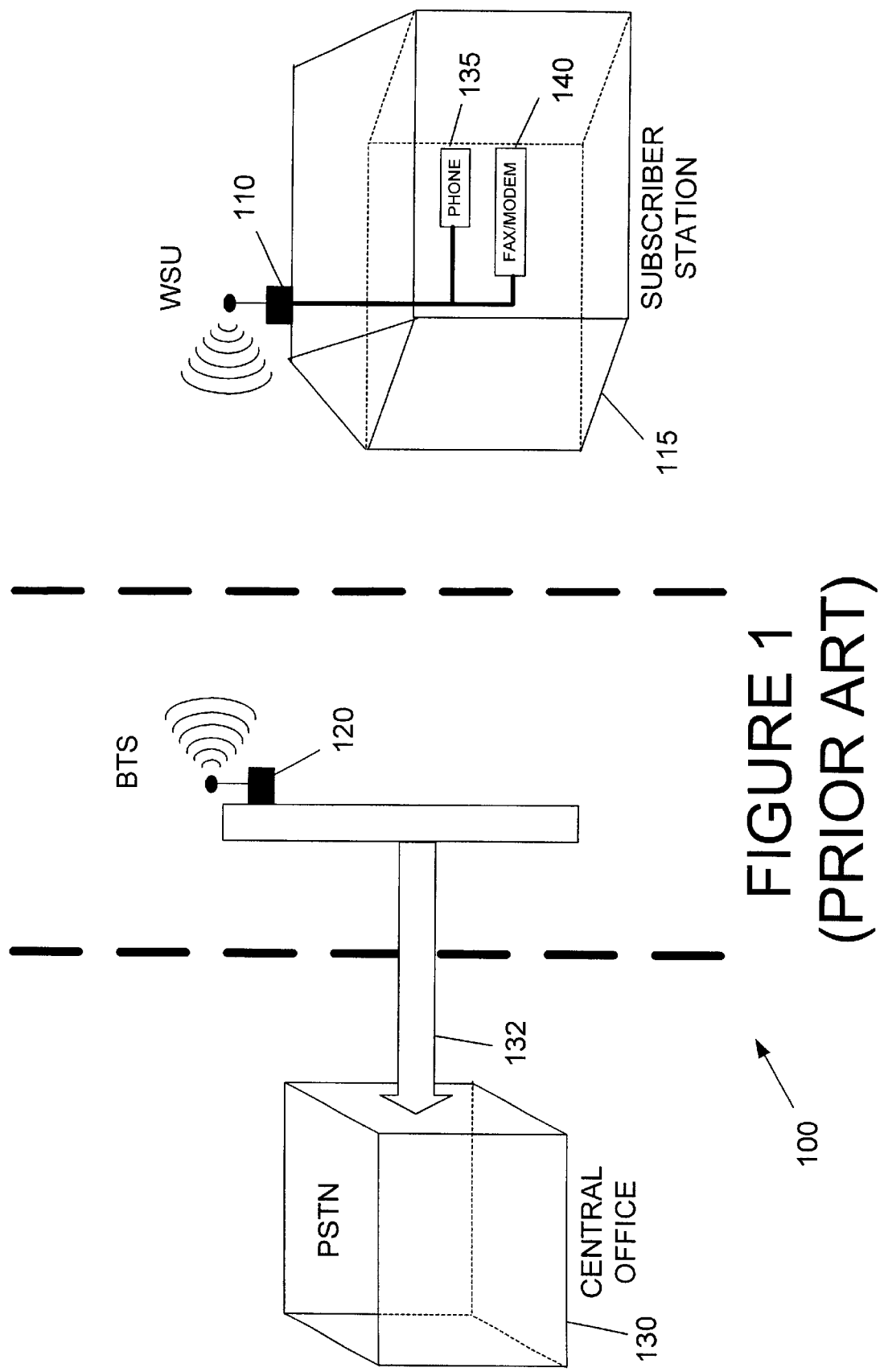
FIG. 1 is a prior art illustration of a stylized block diagram of a WLL network.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
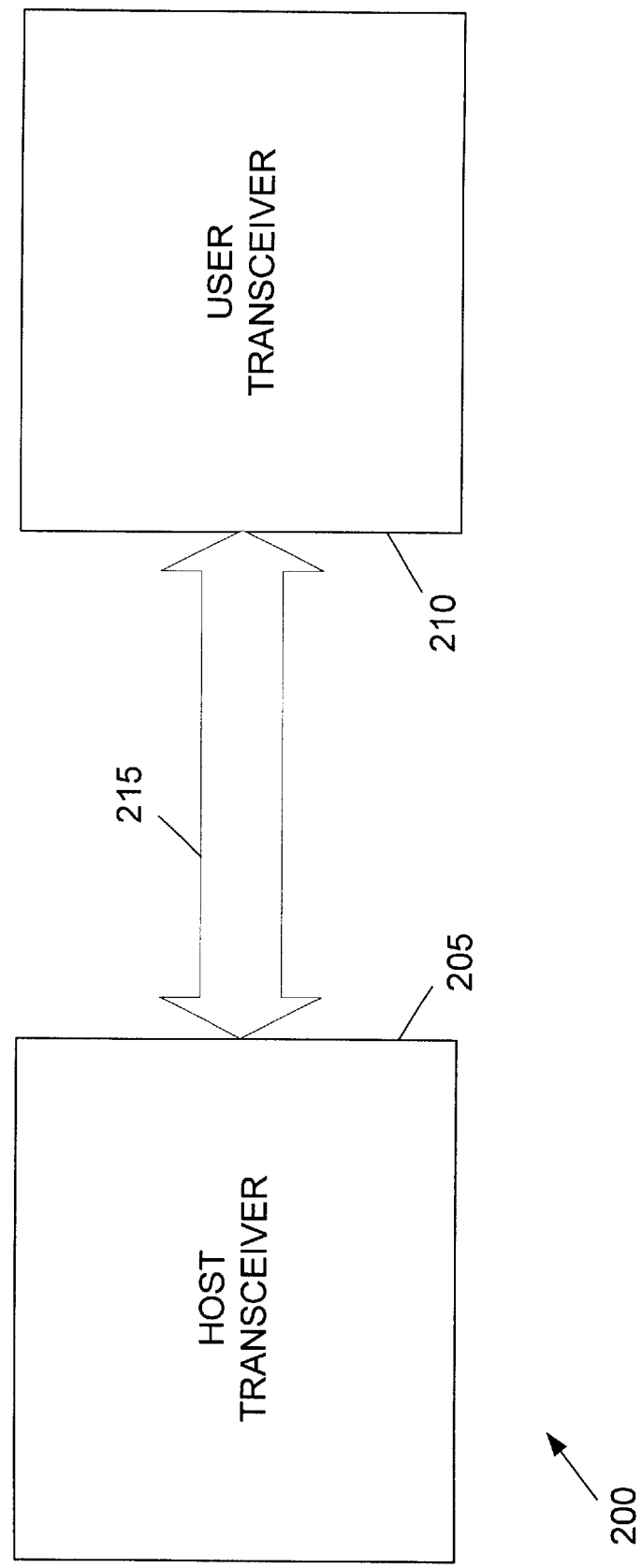
FIG. 2 illustrates a communications system in accordance with the present invention.

Referring now to the drawings, and in particular to FIG. 2, a communications system 200 in accordance with the present invention is illustrated. The communications system 200 includes a host transceiver 205 and a user transceiver 210 capable of communicating with each other over a connection 215. The connection 215 may be either a wireline connection or a wireless connection, depending on the application. Generally, the host and user transceiver 205, 210 communicate with each other using a common communications protocol (i.e. a communications standard such as DECT, PHS, NETBIOS, TCP/IP, etc.) that defines the transmission parameters such as the format of data to be transmitted, error checking algorithm, retransmission scheme, and the like. In one embodiment, the host and user transceivers 205, 210 may be a pair of modems or fax machines. In an alternative embodiment, the host transceiver may be a base station for a cellular telephone network or a WLL network, and the user transceiver may be a cellular telephone of the cellular telephone network or a wireless subscriber unit (WSU) of the WLL network.

Figure 3:
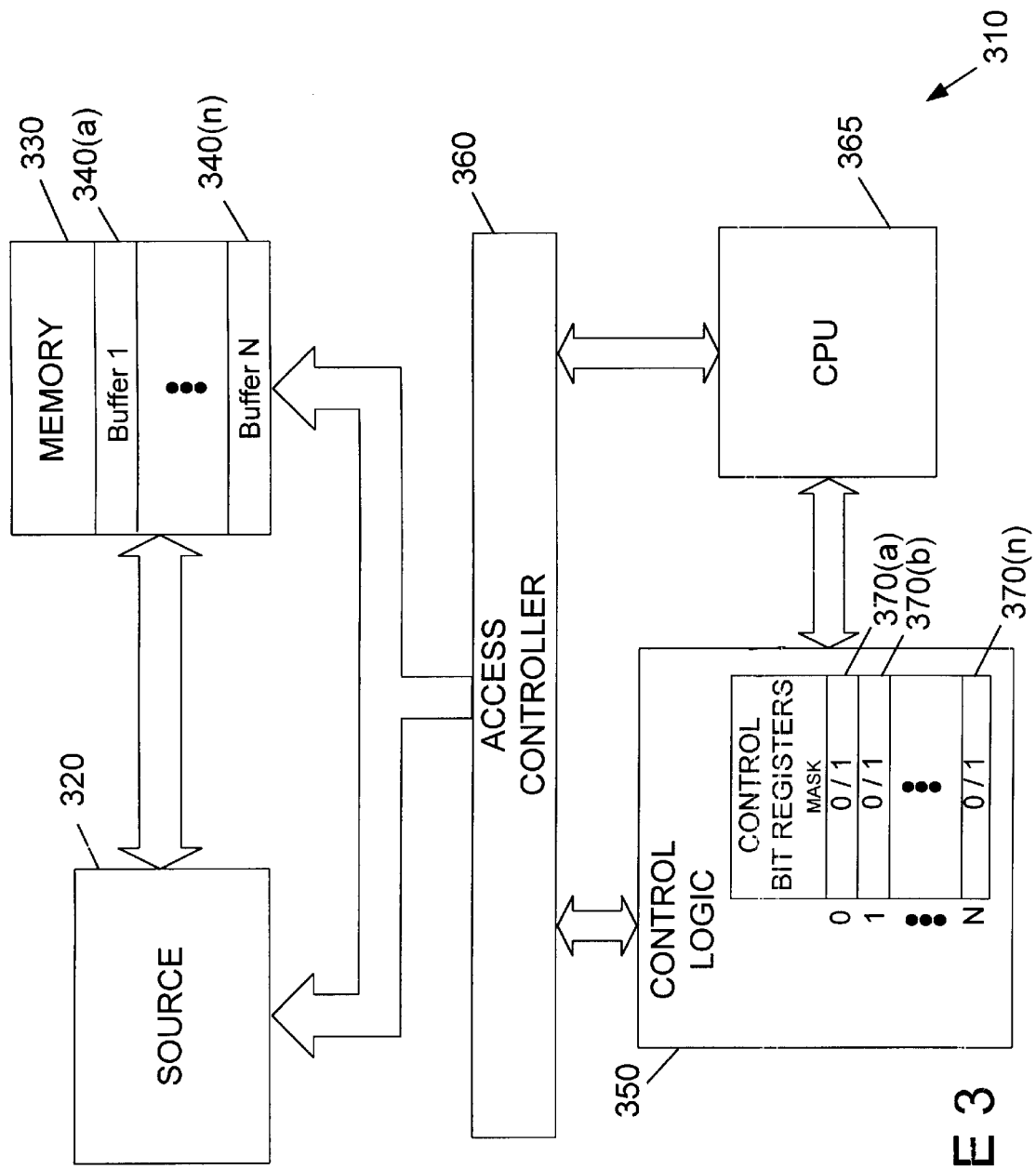
FIG. 3 depicts a stylized block diagram of a transceiver of the communications system of FIG. 2.

FIG. 3 illustrates a stylized block diagram of one embodiment of a transceiver 205 in accordance with the present invention. The transceiver 310 may be the host transceiver 210, the user transceiver 215, or both. In the interest of clarity and to avoid obscuring the invention, only that portion of the transceiver 310 that is utilized to transfer data from a (data) source 320 to a memory 330 before the data is transmitted to a peer station is illustrated. The term "peer station" as utilized herein refers to the transceiver that is receiving the data, and thus can be either the host transceiver 205 or the user transceiver 210. The source 320 may be any type of processor or communications controller, including a digital signal processor, capable of providing data, it may be a memory having data that is to be transmitted to the peer station 205, 210, or it may be any other means capable of providing data. The memory 330 may be any variety of memories known in the art, including, but not limited to, a static random access memory (SRAM), a dynamic random access memory (DRAM), a flash, or any other programmable memory.

The memory 330 is utilized to store data that is transmitted to the peer station 205, 210. In the illustrated embodiment, the memory 330 comprises a plurality of buffers 340(a–n), where the size of each buffer 340(a–n) may vary from one application to another. For example, each buffer 340(a–n) may comprise a plurality of bytes of memory or a plurality of pages of memory. Generally, the total buffer 340(a–n) size is determined by the available bandwidth of the technology. The size of each buffer 340(a–n) is based upon the minimum packet units supported by the technology. In one embodiment, the buffers 340(a–n) may be utilized to store data that is transmitted to the peer station 205, 210.

In accordance with the present invention, the transceiver 310 includes a control logic 350 that is capable of transferring data to/from the source 320 to the memory 330 without requiring a CPU 365 to continuously reprogram the access controller 360 before each memory access. The access controller 360 is capable of transferring data from the source 320 to the memory 330. In one embodiment, the access controller 360 can be a direct memory access (DMA) controller. The control logic 350 comprises a plurality of control bit registers 370(a–n), wherein each buffer 340(a–n) of the memory 330 has a corresponding control bit register 370(a–n). Each control bit register 370(a–n) comprises at least one control bit for configuring the buffers 340(a–n) of memory 330. Although not so limited, the illustrated embodiment employs one control bit, a mask bit. Alternative embodiments, as described in more detail below, utilize additional control bits.

The mask bits identify the buffers 340(a–n) of the memory 330 that are utilized for transferring data to the peer station 205, 210. For example, the buffers 340(a–n) having a mask bit of zero (hereinafter also referred to as "unmasked" buffers 340(a–n)) are identified as part of the memory 330 that will be utilized for data transfer. The buffers 340(a–n) having a mask bit of one, on the other hand, are considered to be part of the memory 330 that can be utilized for purposes other than data transfer (i.e., for general purpose). In the illustrated embodiment, the mask bits serve at least three important functions. First, the mask bits allow the size of the memory 330 that is employed to transmit or receive data to be configurable. Second, with mask bits, the buffers 340(a–n) utilized for transmitting or receiving data no longer have to be contiguous. Third, the mask bits allow the control logic 350 to fetch a variable amount of data from the source 320 without the intervention of the CPU 365, as described in more detail below. The actual values assigned (i.e., a zero or a one) to the mask bits in the present invention are illustrative, and it is contemplated that other values may be utilized without deviating from the spirit and scope of the invention.

Before each transmission, a user identifies, via software or other means, the buffers 340(a–n) that are utilized to transfer data by setting the mask bits of the buffers 340(a–n) to zero. The control logic 350, based on the mask bits, tracks the buffers 340(a–n) of the memory 330 that are employed to transfer data. A data request (DRQ) is asserted, either by the control logic or the user, to initiate data transfer from the source 320 to the memory 330 without the real-time intervention of the CPU 365. Based on the number of mask bits that are set to zero, the control logic 350 instructs the access controller 365 to transfer the data from the source 320 to the memory 330.

Although the present invention is described with reference to transferring data from the source 320 to the memory 330, it is contemplated that the present invention may also be employed for transferring data from the memory 330 to the source 320 without a need of continuously reprogramming the access controller 360 before each data transfer. In this case, the source 320 acts as the destination (i.e. as opposed to a "source") for data transferred from the memory 330.

Figure 4:
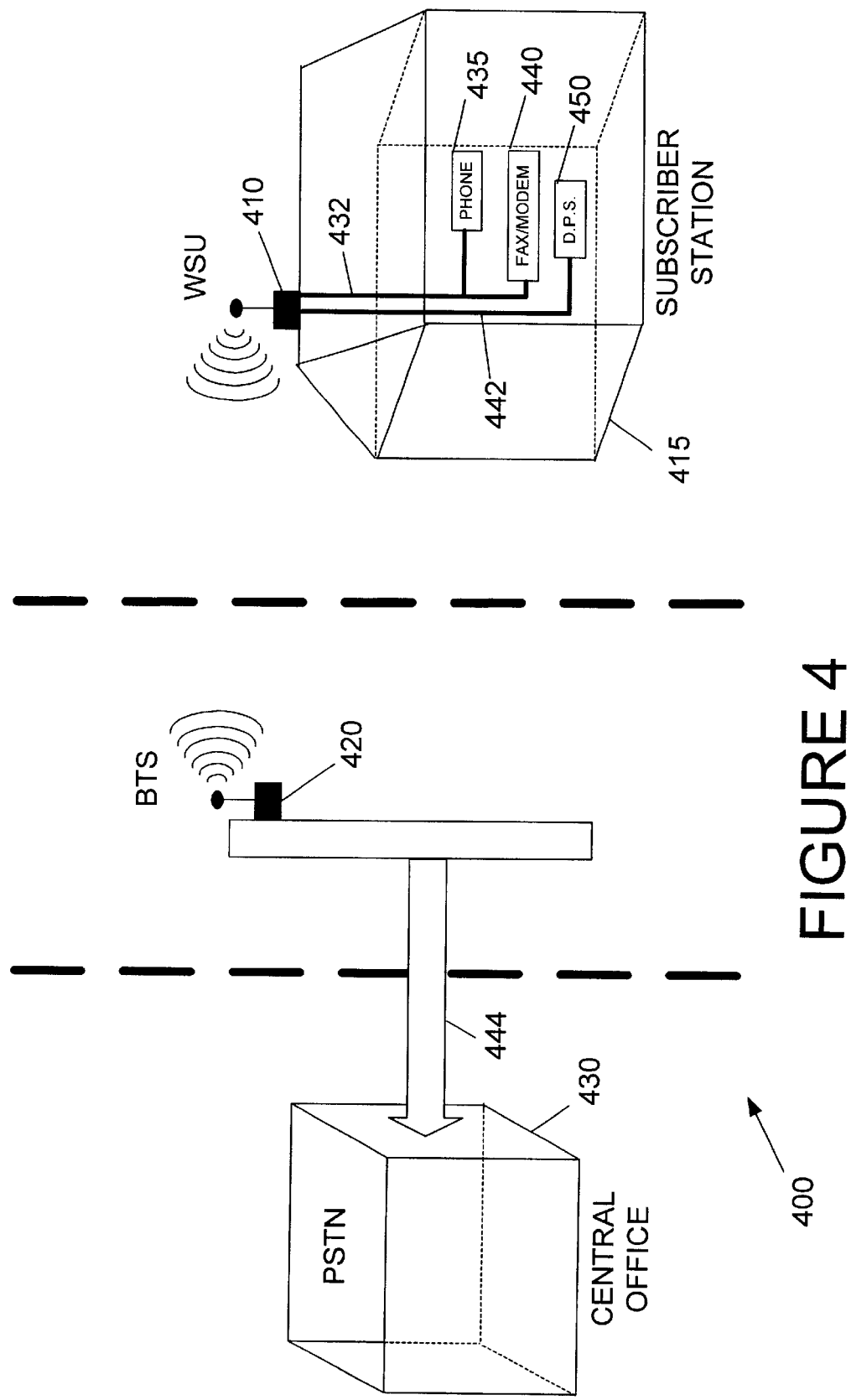
FIG. 4 illustrates a block diagram of a WLL network in accordance with the present invention.

FIG. 4 illustrates a stylized block diagram of an alternative embodiment of a communications system 200 in accordance with the present invention. Specifically, the communications system 400 in the illustrated embodiment is a WLL network 400, where the user transceiver 210 is a Wireless Subscriber Unit (WSU) 410 located at a subscriber station 415 and the host transceiver 205 is a remote Basestation Transceiver System (BTS) 420. The BTS 420 links the WSU 410 to a central office 430, thus allowing a user at the subscriber station 415 to communicate with other subscriber stations (not shown) through the central office 430. In the illustrated embodiment, the WSU 410 is capable of supporting voice and/or data communications. Specifically, the WSU 410 supports a single analog line 432 for a telephone 435 or a modem 440 to use, as well as a data line 442 for providing packet switched data access to the data processing system 450. In some cases, the data line 442 can be removed and data can be modulated to share the same line 432 as voice. This requires a specialized data modem within the WSU 410 and data process system 450. A connection 444 between the BTS 420 and the central office 430 may be made via a wire-line, fiber or microwave link, depending on the bandwidth, distance, and the terrain.

One popular WLL protocol is the DECT protocol, which is based on a micro-cellular radio communication system that provides low-power radio (cordless) access, at least as it pertains to the WLL network 400, between the WSU 410 and the BTS 420 at ranges up to a few hundred meters. The DECT protocol is described in the European Telecommunications Standard, ETS 300 175 (Parts 1 through 9) (1996), entitled "Radio Equipment and Systems (RES); Digital Enhanced Cordless Telecommunications (DECT); Common Interface (CI)," which is incorporated herein by reference in its entirety. The basic technical characteristics of the DECT protocol are shown below in Table 1. Other pertinent DECT protocol references include ETR 185, entitled "Radio Equipment and Systems (RES); Digital European Cordless Telecommunications (DECT); Data Services Profile (DSP); Profiles Overview," ETS 300 765-1, ETS 300 765-2, entitled "Radio Equipment and Systems (RES); Digital European Cordless Telecommunications (DECT); Radio in the Local Loop (RLL) Access Profile (RAP); Part 1: Basic telephony services," ETS 300 765-2, entitled "Radio Equipment and Systems (RES); Digital European Cordless Telecommunications (DECT); Radio in the Local Loop (RLL) Access Profile (RAP); Part 2: Advanced telephony services," Draft EN (reference number not yet assigned), V0.0.1 (1998-11), entitled "Digital European Cordless Telecommunications (DECT); Data Services Profile (DSP); DECT Packet," EN 300 435, entitled "Radio Services (DPRS) Digital European Cordless Telecommunications (DECT); Data Services Profile (DSP); Base standard including inter-working to connectionless networks (Service types A and B, class 1)," EN 300 651, entitled "Digital European Cordless Telecommunications (DECT); Data Services Profile (DSP); Generic data link service (service type C, class 2), which are incorporated herein by reference in their entirety."

TABLE 1

Technical Characteristics for DECT protocol

| | |
|---|---|
| Frequency Band | 1880–1900 MHz |
| Number of Carriers | 10 |
| Carrier Spacing | 1728 MHz |
| Peak Transmit Power | 250 mW |
| Carrier Multiplex | TDMA; 24 slots per frame |
| Frame Length | 10 ms |
| Basic Duplexing | TDD using 2 slots on same RF carrier |
| Gross Bit Rate | 1152 kbit/sec |
| Net Channel Rates | 32 kbit/sec B-field (traffic) per slot |
| Packet Data (effective bit rate) | 552 kbit/sec |

The DECT protocol provides protected and unprotected modes of operation. The unprotected mode is generally utilized for transferring voice and modem signals, while the protected mode is generally employed for packet data transfer.

Figure 5:
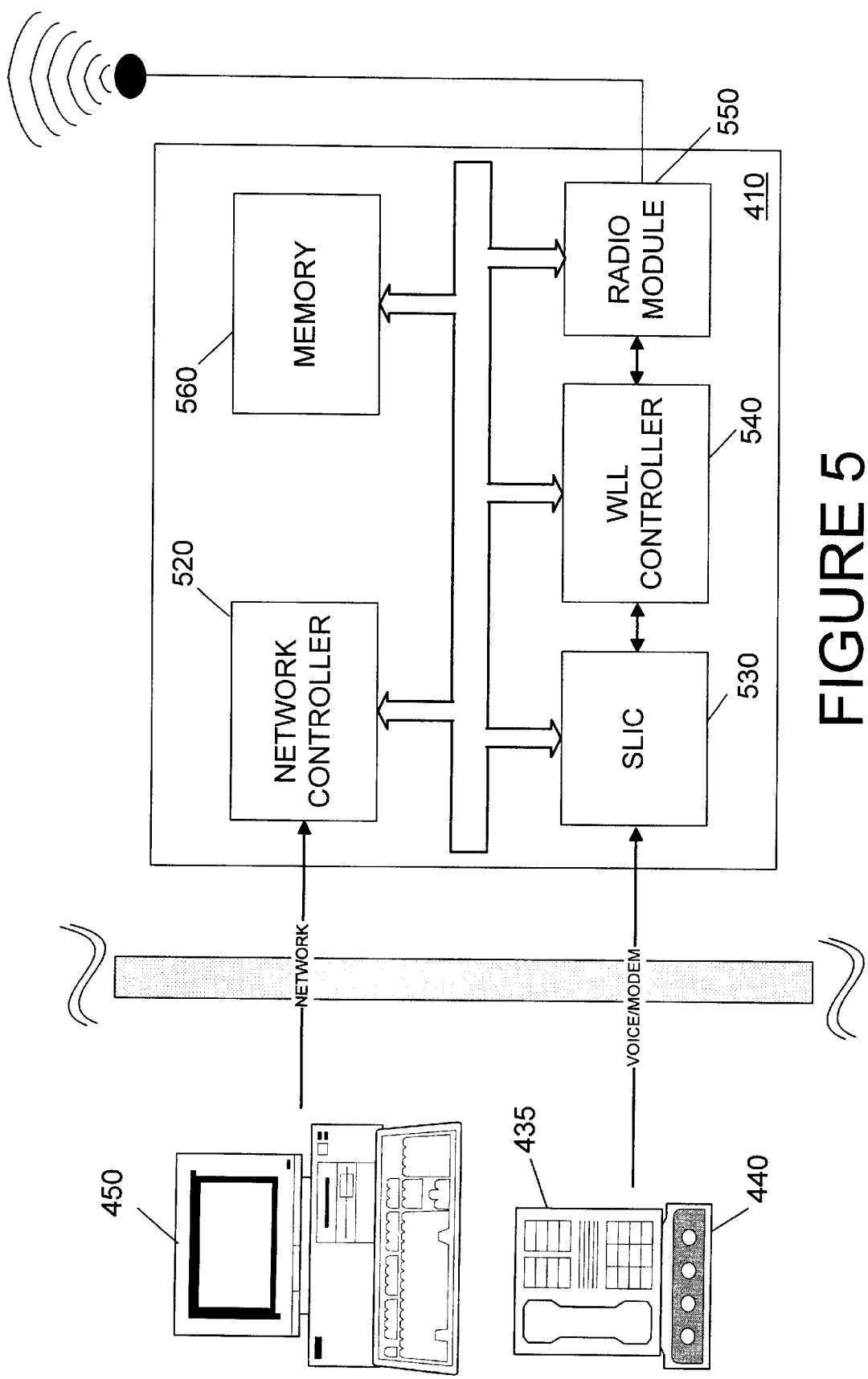
FIG. 5 depicts a Wireless Subscriber Unit of the WLL network of FIG. 4 in accordance with the present invention.

FIG. 5 illustrates a stylized block diagram of one embodiment of the WSU 410 in accordance with the present invention. A data processing system 450, the phone 435, and the modem 440 provide packet data, voice data, and modem data, respectively, to the WSU 410, which then transmits the data to the BTS 420. The data processing system 450 is capable of providing packet data to a network controller 520 of the WSU 410 through a network card (not shown), such as a token ring card, an Ethernet card, a PCnet card, and the like. A Subscriber Line Interface Circuit (SLIC) 530 of the WSU 410 provides the voice/modem 435, 440 interface. A WLL controller 540 formats the packet, voice, and modem data according to the DECT protocol and then provides it to a radio module 550 for transmission. Similarly, the WLL controller 540 is also responsible for processing received DECT frames, decoding and storing protocol messages, and directing the user information to the appropriate devices (not shown) or buffers (described below in more detail).

The packet data is provided by the data processing system 450 to the network controller 520, which formats the packet data into smaller sized packet data units (PDUs) and stores the PDUs in an external memory 560 of the WSU 565. The external memory 560 acts as a buffer to the WLL controller 540 because the WLL controller 540 is generally unable to transmit the packet data at the rate the data is provided to the WLL controller 540 by the data processing unit 450. Accordingly, the PDUs are stored in the external memory 560 by the network controller 520, and later retrieved by the WLL controller 540 for transmission on an as needed basis.

Figure 6:
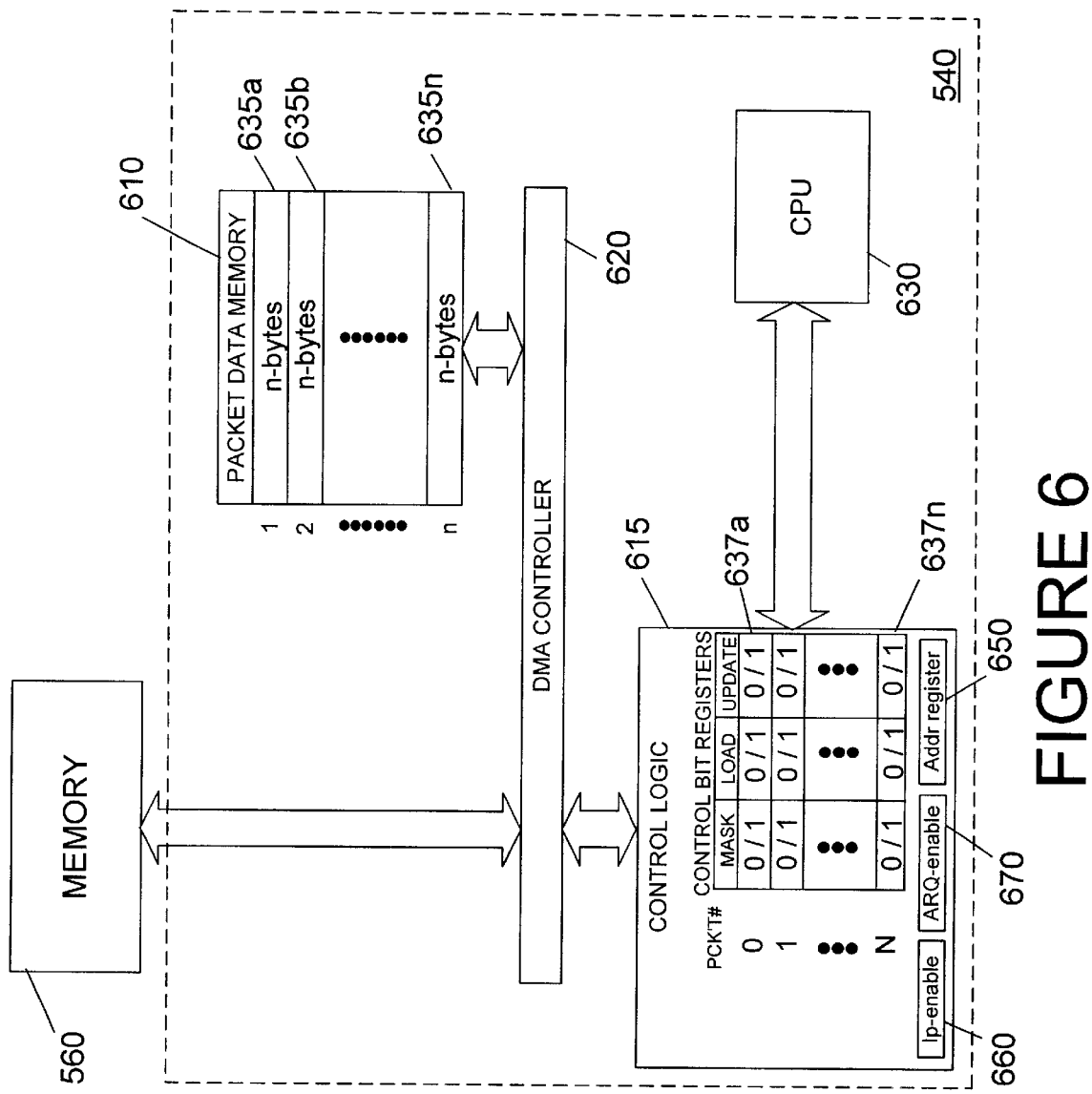
FIG. 6 illustrates a stylized block diagram of the Wireless Subscriber Unit of FIG. 5 in accordance with the present invention.

FIG. 6 illustrates a stylized block diagram of the WLL controller 540. More specifically, in the interest of clarity and to avoid obscuring the invention, only that portion of the WLL controller 540 that is utilized to transfer data from the external memory 560 to an "on-chip" memory (hereinafter referred to as "packet data memory") 610 of the WLL controller 540 is illustrated. The WLL controller 540 includes a control logic 615, which is capable of moving blocks of data from the external memory 560 to packet data memory 610 without a need of continuously reprogramming a direct memory access ("DMA") controller 620 by a CPU 630 of the WLL controller 540. Once the data is transferred from the external memory 560 to the packet data memory 610, the WLL controller 540 transfers the stored data from the packet data memory 610 to the radio module 550 for transmission to its counterpart, the BTU 420 (see FIG. 4). The description hereinafter relates to transmission of data in an uplink connection (i.e., transfer from the WSU 410 to BTU 420), however, it is contemplated that the present invention is equally applicable in a downlink connection (i.e., transfer from the BTU 420 to the WSU 410).

The DECT retransmission scheme for the packet data transmission sometimes requires that a variable amount of data be moved from the external memory 560 to the packet data memory 610. This is due to the fact that data from earlier frames may occasionally need to be retained in the packet data memory 610 for retransmission and thus cannot be overwritten by new data. The control logic 615 is capable of determining the amount of new data that is required for every frame from the external memory 560, initiating the transfer from the external memory 560 to the packet data memory 610 using the DMA controller 620, and then terminating the DMA transfer.

The packet data memory 610 can be any of a variety of single-ported or multi-ported memory known to the art, including static random access memory (SRAM), dynamic random access memory (DRAM), flash, or any other programmable memory. In the illustrated embodiment, the packet data memory 610 is a dual-port memory comprising a plurality of buffers 635($a-n$). It is contemplated that the size and type of the memory 610 employed may vary from one implementation to another. A dual-port memory 610 allows a simultaneous read and write access to the packet data memory 610. The buffers 635($a-n$) of the packet data memory 610 are utilized to store data that is transmitted, as well as for data that is received. In this particular implementation, the packet data memory 610 includes twenty-four 32-byte buffers that correspond to the number of time slots of a DECT frame. Thus, there is a corresponding buffer 635($a-n$) for each time slot. Additionally, the control logic 615 includes a plurality of control bit registers 637 ($a-n$), wherein each buffer 635($a-n$) of the packet data memory 610 has a corresponding control bit register 637 ($a-n$). Each control bit register 637($a-n$) comprises a plurality of control bits for configuring the packet data memory 610. Although the present invention employs a control bit register 637(*a–n*) in conjunction with control bits to configure the packet data memory 610, it is contemplated that other means may also be employed to configure the packet data memory 610.

Those skilled in the art will appreciate that the number and type of control bits employed is implementation specific. In the illustrated embodiment, a mask bit, a load bit, and an update bit are utilized. Mask bits identify the buffers 635(*a–n*) of the packet data memory 610 that will be utilized for data transfer. For example, if the mask bits of the first and second control bit registers 637*a*, 637*b* are set to zero, and the mask bits for the remaining control bit registers 637(*c–n*) are set to one, then only the first and second buffers 635*a*, 635*b* of the packet data memory 610 are utilized to transmit data. Accordingly, only the first and second buffers 635*a*, 635*b* of the packet data memory 610 are employed to store data that is retrieved from the external memory 560 for transmission. In the illustrated embodiment, the mask bits allow the size of the packet data memory 610 that is employed to transmit data to be configurable, as well as allow the buffers 635(*l–n*) to be non-contiguous. The load bits identify which "masked" buffers (i.e., buffers having the mask bit set to zero) 635(*a–n*) of the packet data memory 610 require new data. For instance, referring to the above example, if the load bits of the first and second buffers 635*a*, 635*b* are zero and one, respectively, then only the second buffer 635*b* requires new data. In the illustrated embodiment, the load bits allow the control logic 615 to fetch a variable amount of data from the external memory 560 without the intervention of the CPU 630, as described in more detail below. The update bits identify the buffers 635(*a–n*) from which the data has been extracted and transmitted to the BTS 420.

Figure 7:
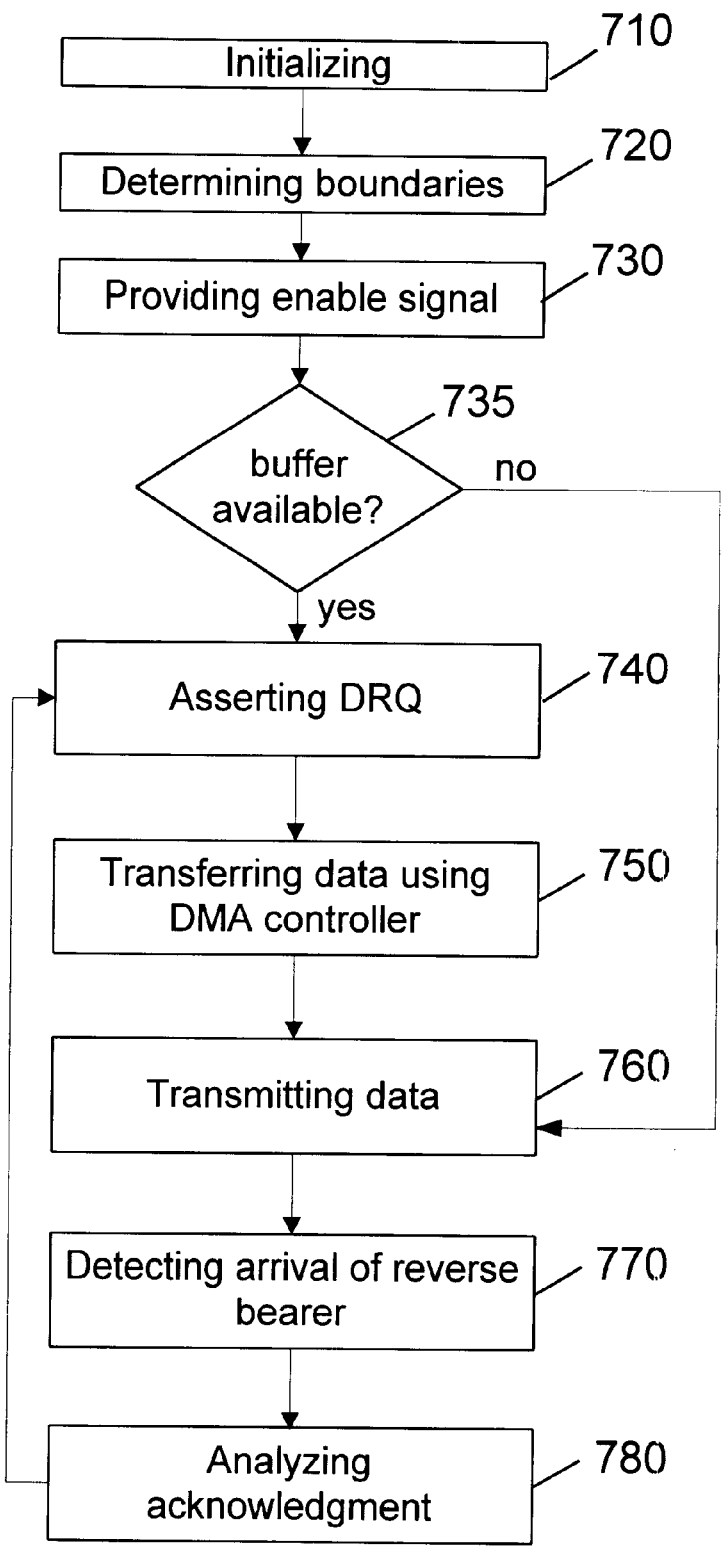
FIG. 7 illustrates a method in accordance with the present invention that can be employed by the Wireless Subscriber Unit illustrated in FIGS. 5 and 6.
Figure 8:
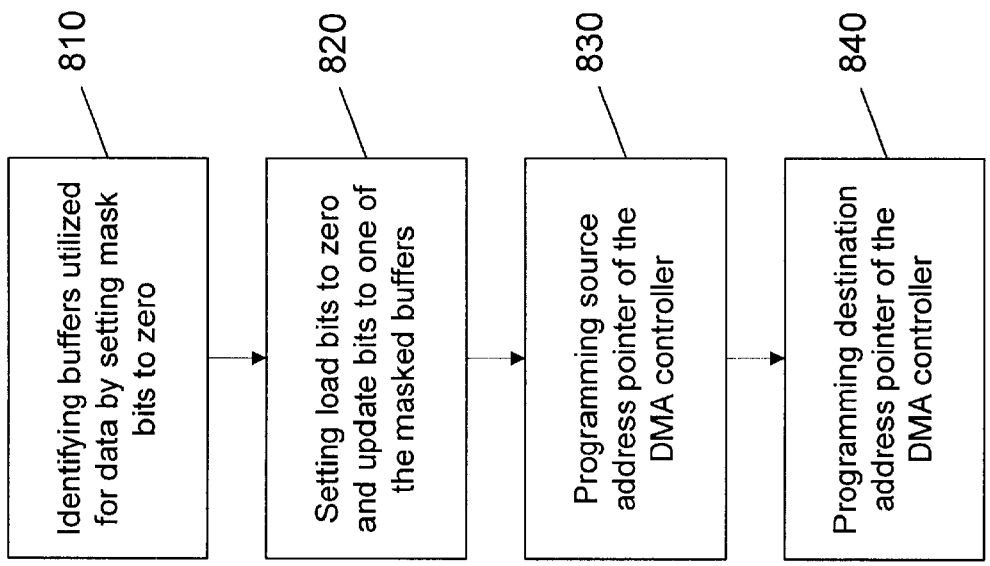
FIG. 8 illustrates one embodiment of an initialization method employed by the method of FIG. 7.

In accordance with the present invention, the control logic 615 of the WSU 540 is capable of transferring data from the external memory 560 to the packet data memory 610 without the real-time intervention of the central processing unit 630. The WSU 540 employs a method of FIG. 7 to accomplish the data transfer from the external memory 560 to the packet data memory 610. The method of FIG. 7 begins at block 710, where the control bit registers 637(*a–n*) and the DMA controller 620 are initialized. The initialization process is illustrated in FIG. 8. At block 810, the control bit registers 637(*a–n*) are initialized by setting the mask bits of the buffers 635(*a–n*) of the packet data memory 610 that are to be utilized for the packet data asymmetric connection to zero. Additionally, at the block 810, the load bits for the unmasked buffers 635(*a–n*) are set to zero to indicate that the unmasked buffers 635(*a–n*) need new data, and the update bits are set a value of one to indicate that the contents of the unmasked buffers 635(*a–n*) have not yet been extracted and transmitted to the BTS 420. At block 820, the source address pointer of the DMA controller 620 is programmed to point to the relevant address in the external memory 560. The source address pointer of the DMA controller 620 is programmed to increment following every transfer. At block 830, the destination address pointer of the DMA controller 620 is programmed to point to a control logic register 650 that specifies a starting location for storing data in the packet data memory 610. The destination address pointer of the DMA controller 620 is programmed such that it does not increment following every transfer.

Referring back to FIG. 7, after the initialization process of the block 710 is complete, at block 720, the control logic 615 determines the 32-byte boundaries (starting with the initial address) of the buffers 635(*a–n*) of the packet data memory 610. The boundaries are identified by the control logic 615 for two primary reasons: First, to determine if a buffer (32-byte segment) 635(*a–n*) needs to be skipped while data is being transferred from the external memory 560. A buffer 635(*a–n*) is skipped if either its corresponding mask or load bit is set to one. Second, to determine if a buffer pointer has wrapped around (i.e., the buffer pointer is past the last unmasked buffer 635(*a–n*)). The control logic 615 ensures that the buffer pointer points to the next unmasked buffer 635(*a–n*) that is available for storing data. After the assertion of the first DRQ, the control logic 615 generally initiates subsequent DMA transfers immediately following the reception and processing of a reverse bearer, provided that at least one of the buffers 635(*a–n*) is free to receive new data. A reverse bearer (i.e., an "acknowledgement" signal), in an uplink connection, for example, provides an acknowledgment to the WSU 540 from the BTS 420, indicating whether the transmission was successful or not.

At block 730, an enable signal is provided to the control logic 615. At block 735, the control logic determines if at least one buffer 635(*a–n*) is available for receiving data. That is, the control logic 615 searches the packet data memory 610 and identifies a unmasked buffer 635(*a–n*) having an associated load bit equal to zero. If at least one buffer 635(*a–n*) is available, then the buffer pointer is set by the control logic 615 to point to an available buffer 635(*a–n*) that is ready to receive new data. If no buffer 635(*a–n*) is available to receive the new data (i.e. all the buffers are full), then steps in blocks 740 and 750 are skipped. The control logic 615 initiates a DMA transfer from the external memory 560 by asserting, at block the 740, a data request (DRQ) in response to the enable signal. Although a variety of enabling schemes can be employed, in the illustrated embodiment, the enable signal comprises programming two registers, $I_p$_enable and DRQ_enable 660, 670, with a value of one. The $I_p$_enable register 660 having a value of one causes the control logic 615 to automatically handle the DECT $I_p$ retransmission scheme for uplink connections.

Figure 9:
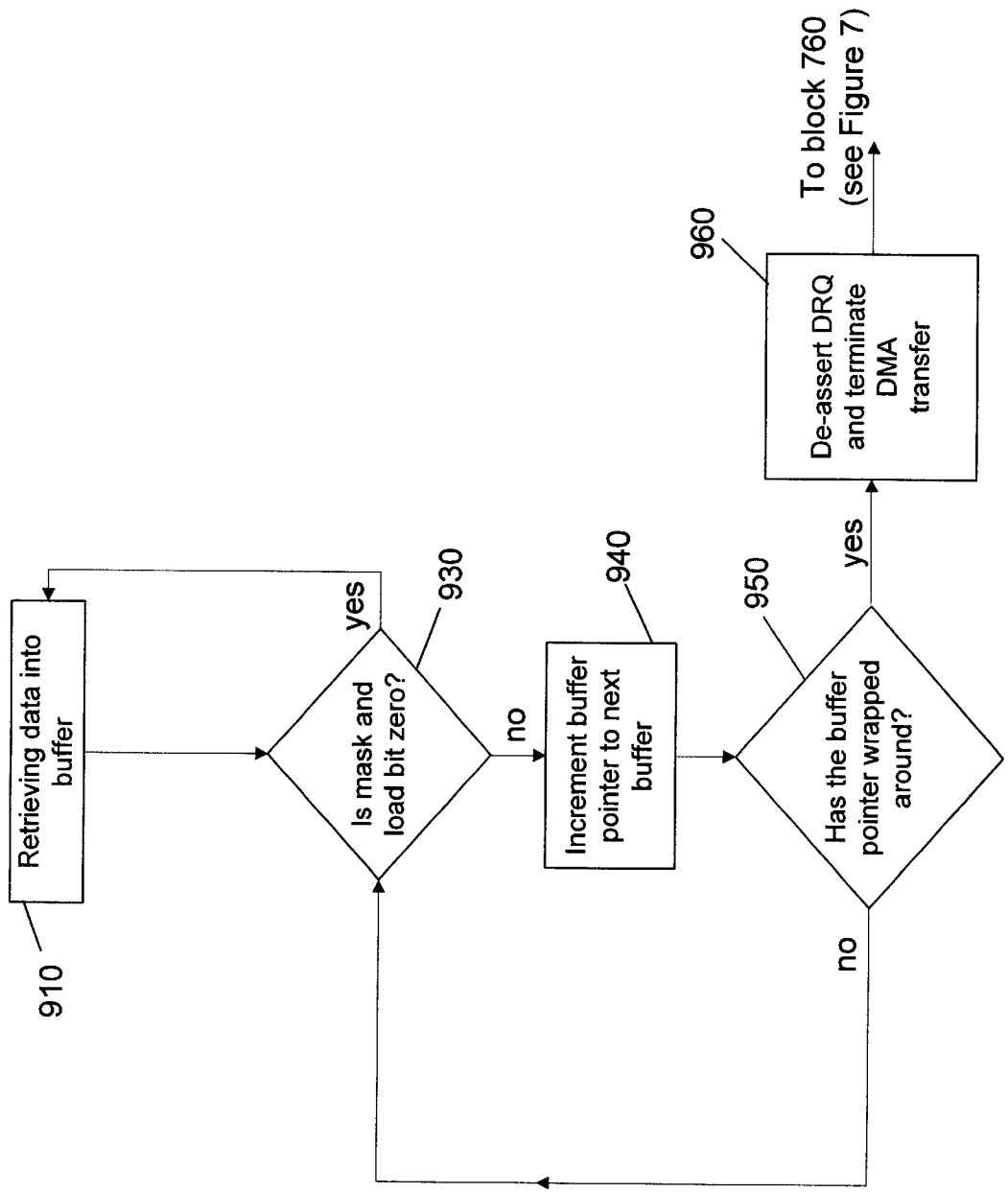
FIG. 9 depicts one embodiment of a method for transferring data employed by the method of FIG. 7.

In response to the DRQ request, the DMA controller 620, which is programmed with the source address during initialization at the block 710, transfers the data, at the block 750, from the external memory 560 to the buffer 635(*a–n*) identified by the buffer pointer of the control logic 615. The buffer pointer points to the address specified by the address register 650 of the control logic 615. The process of transferring data at the block 750 from the external memory 560 to the packet data memory 610 is described in more detail in FIG. 9. At block 910 of FIG. 9, the first DMA transfer occurs in response to the DRQ request at the block 740 (see FIG. 7). At block 930, the control logic 615 determines if the mask and load bits of the buffer 635(*a–n*) identified by the buffer pointer are equal to zero. A mask bit of a zero indicates that the corresponding buffer 635(*a–n*) of the packet data memory 610 is being utilized to transfer data, and a load bit of zero indicates that the corresponding buffer 635(*a–n*) needs to be loaded with new data. Thus, if both mask and load bits of a buffer 635(*a–n*) are zero, then, at the block 910, additional data may be retrieved and stored in the buffer 635(*a–n*). On the other hand, if both the mask and load bits are not equal to zero, then, at block 940, the buffer pointer is incremented to the next buffer. In the illustrated embodiment, because each buff&r is 32 bytes, the buffer pointer is incremented by 32 bytes. At block 950, the control logic 615 determines if the buffer pointer has wrapped around (i.e., the buffer pointer has moved past the last unmasked buffer 635(*a–n*) and returned to the initial location). If no, the control logic 615 once again determines, at the block 930, whether the mask and load bits of the buffer 635(*a–n*) identified by the buffer pointer are equal to zero. If, on the other hand, the buffer pointer has wrapped around, then the control logic 615, at block 960, de-asserts the DRQ and terminates the DMA transfer.

Referring back to FIG. 7, after the termination of the DMA transfer at the block 960 (see FIG. 9), the data from the buffers 635(*a–n*) is, at block 760 (see FIG. 7), transferred to the BTS 420. The update bit is set to a value of zero for each buffer 635(*a–n*) transmitted to indicate that data from that buffer 635(*a–n*) has been transmitted to the BTS 420. At block 770, the arrival of a reverse bearer is detected, and in response, at block 780, an acknowledgement analysis is performed on a slot-by-slot basis of the data transmitted during an earlier frame. That is, as per DECT protocol, the reverse bearer from the BTS 420 provides an acknowledgement of an earlier transmission, wherein the reverse bearer indicates, on a slot-by-slot basis, which data successfully reached the BTS 420. Because it is necessary to perform the acknowledgement analysis of the block 780 for only those buffers 635(*a–n*) for which the data was transmitted, the acknowledgement data for only those buffers 635(*a–n*) having an update bit equal to zero are analyzed. During the acknowledgement analysis at the block 780, the buffers 635(*a–n*) whose mask bits are equal to zero and whose update bits are equal to zero are identified. The load bits for these identified buffers 635(*a–n*) are set to zero, if the corresponding transmission was successful. Accordingly, if the transmission was successful for unmasked buffers 635(*a–n*) having an update bit of zero, then the corresponding load bits of these buffers 635(*a–n*) are set to zero, indicating that these buffers 635(*a–n*) need new data. After the reception of the reverse bearer at the block 770, as well as the completion of the acknowledgement analysis at the block 780, the control logic 615, at the block 740, re-asserts a DRQ to retrieve new data for the unmasked buffers 635(*a–n*) having a load bit of zero. The above process is repeated until all of the data has been transmitted to the BTS 420. The control logic 615, thus, in conjunction with the mask, load, and update bits, manages the transfer of varying amounts of data from the external memory 560 to the packet data memory 610.

Although the present invention is described with reference to transferring data from the external memory 560 to the packet data memory 610, it is contemplated that the present invention may also be employed for transferring data from the packet data memory 610 to the external memory 560 without a need of continuously reprogramming the memory controller 620 before each data transfer. That is, the control logic 615, in conjunction with the mask, load, and update bits, may also be capable of transferring varying amounts of data from the external memory 560 to the packet data memory 610 during a downlink connection. During a downlink connection, the data is retrieved into the unmasked buffers 635(*a–n*) and eventually transferred to the external memory 560. Because the process of transferring varying amounts of data from the external memory 560 to the packet data memory 610 in a downlink connection may be accomplished in a similar manner as described above for an uplink connection, such a process is not described in detail herein.

FIG. 10 illustrates an exemplary sequence of the operation of the control bits of FIG. 6. The operation of the control bits is described with reference to the method of FIG. 7. Each column, identified by a sequence number ("S"), represents a specific operation that may require the value of the control bits to change. These changes are denoted on the top portion of each column.

At S=1, and at the block 710, the mask, load, and update bits are initialized. Specifically, the corresponding mask bit of each buffer 635(*a–n*) is set to zero to identify the buffers 635(*a–n*) that will be utilized for data transfer. Additionally, the load bits of the unmasked buffers 635(*a–n*) are set to zero to indicate that these unmasked buffers 635(*a–n*) need new data, and the update bits of the unmasked buffers 635(*a–n*) are initially set to one to indicate that the contents of the unmasked buffers 635(*a–n*) have not yet been transmitted. At the block 720, the control logic 615 determines the boundaries of the packet data memory 610 that will be utilized for data transfer. The control logic 615 asserts the first DRQ at the block 740 in response to receiving an enable signal at the block 730.

At S=2, and at the block 750, the control logic 615 transfers data from the external memory 560 to the buffers 635(*a–n*) having a mask bit of zero. After the data transfer is complete, the load bit of each unmasked buffer 635(*a–n*) is set to one to indicate that no new data is needed.

At S=3, and at the block 760, the data from the unmasked buffers 635(*a–n*) is extracted and transmitted to the BTS 420. The update bits are set to zero to indicate that the contents of the unmasked buffers 635(*a–n*) have been transmitted.

At S=4, and at the block 770, the reverse bearer is detected. The acknowledgement analysis is performed on the unmasked buffers 635(*a–n*) whose update bits are set to zero. Assuming that the transmission for all buffers 635(*a–n*) is successful, then, at the block 780, the load bits of the unmasked buffers 635(*a–n*) are set to zero to indicate that these buffers 635(*a–n*) need new data.

At S=5, and at the block 740, the control logic 615 asserts a DRQ after the reception of the reverse bearer and after the acknowledgement analysis. At the block 750, the data is transferred from the external memory 560 to the unmasked buffers 635(*a–n*) of the packet data memory 610. Only the unmasked buffers 635(*a–n*) having the load bits equal to one are loaded with new data. In this particular case, since the transmission for all the unmasked buffers 635(*a–n*) was successful, all the unmasked buffers 635(*a–n*) require new data. After the unmasked buffers 635(*a–n*) have been loaded with new data, the corresponding load bits and update both of the unmasked buffers 635(*a–n*) are set to one.

At S=6, and at the block 760, the data from the unmasked buffers 635(*a–n*) is extracted and transmitted to the BTS 420. The update bits are set to zero to indicate that the contents of the unmasked buffers 635(*a–n*) have been transmitted. If an update bit of a buffer was previously set to zero, then the bit is unchanged.

At S=7, and at the block 770, the reverse bearer is detected. The acknowledgement analysis is performed on the unmasked buffers 635(*a–n*) whose update bits are set to zero. Assuming that the transmission for a portion of the buffers 635(*a–n*) is not successful, then, at the block 780, the load bits of the unmasked buffers 635(*a–n*) are left unchanged to indicate that the buffers 635(*a–n*) do not require new data.

At S=8, and at the block 740, the control logic 615 asserts a DRQ after the reception of the reverse bearer and after the acknowledgement analysis. At the block 750, the data, if required, is transferred from the external memory 560 to the unmasked buffers 635(*a–n*) of the packet data memory 610. Only the unmasked buffers 635(*a–n*) having the load bits equal to one are loaded with new data. After the unmasked buffers 635(*a–n*) with load bits of one have been loaded with new data, the load bits and the update bits of these unmasked buffers 635(*a–n*) are set to one.

At S=9, and at the block 760, the data from the unmasked buffers 635(*a–n*) is extracted and transmitted to the BTS 420. The update bits are set to zero to indicate that the contents of the unmasked buffers 635(a–n) have been transmitted. If an update bit of a buffer 635(a–n) was previously set to zero, then the bit is unchanged.

At S=10, and at the block 770, the reverse bearer is detected. The acknowledgement analysis is performed on the unmasked buffers 635(a–n) whose update bits are set to zero. The load bits of the unmasked buffers 635(a–n) that are not successfully transferred are left unchanged, while the load bits of unmasked buffers 635(a–n) that are successfully transferred are set to zero to indicate that the buffers 635(a–n) require new data.

The last two columns, S=11 and S=12, illustrate that the mask bit can be utilized to vary the size of the packet data memory 610 utilized for data transfer and that the non-masked portion (i.e., mask bit set to one) of the packet data memory 610 can be utilized as a general purpose memory. Specifically, a buffer 635(a–n) having a mask bit of one becomes part of a general purpose memory as is the case at S=11, and a buffer 635(a–n) having a mask bit of zero becomes part of the packet data memory 610 that is utilized for transferring data, as is indicated at S=12.

Those skilled in the art will appreciate that the above-described embodiments with respect to the WLL network 400 may also be pertinent with respect to other communications systems 200 (see FIG. 2) as well. Furthermore, although the present invention has been described with reference to communications systems 200, 400, the application of the present invention is not limited as such. It is contemplated that the application of the present invention may be extended to other technologies as well, including, but not limited to, data processing systems and other electronic devices where quick access to information is desirable.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for accessing data, comprising:
   defining a first portion of a memory for receiving data;
   providing a memory request to transfer data from a source to the first portion of the memory defined to receive the data; and
   transferring a portion of data from the source to the first portion of the memory, wherein
      the size of the portion of the data substantially corresponds to the size of the first portion of the memory,
      wherein providing a memory request includes providing a source to an access controller, wherein the access controller transfers data located at the source address of the source to a location corresponding to a destination address in the fist portion of the memory,
      wherein defining the first portion of the memory includes defining a second portion, wherein the transferring a portion of the data to the first portion of the memory includes transferring a portion of data to the second portion, wherein the size of the portion of the data substantially corresponds to the size of the second portion,
      further including extracting the data from the first portion of the memory, and
      wherein the memory is a dual-port memory and wherein extracting the data from the first portion occurs substantially at the same time as transferring a portion of data to the first memory.

2. The method of claim 1, further including transmitting the data stored in the first portion of the memory.

3. The method of claim 2, further including analyzing an acknowledgment signal received in response to transmitting the data.

4. The method of claim 3, wherein defining a second portion of a memory includes defining the second portion of the memory in response to analyzing the acknowledgment analysis, wherein the size of the second portion of the memory corresponds to the amount of data successfully transferred.

5. The method of claim 4, wherein providing the memory request includes providing the memory request in response to an enable signal.

6. The method of claim 4, wherein providing the memory request includes providing the memory request in response to receiving an acknowledgement signal.

7. The method of claim 6, the first portion of the memory comprising a plurality of buffers and the second portion comprising at least one of the plurality of the buffers, wherein providing a memory request includes providing a source address to an access controller.

8. The method of claim 7, wherein transferring a portion of data from the source to the first portion of the memory includes transferring a portion of data to one of the plurality of buffers corresponding to a destination address.

9. The method of claim 8, wherein transferring a portion of the data corresponding to a destination address includes transferring data starting from a buffer of the plurality of buffers corresponding to the destination address to a last buffer of the plurality of buffers.

10. An apparatus for accessing data, comprising:
    a source for providing data;
    a memory having a first portion configured to receive the data from the source;
    an access controller capable of transferring data from the source to the first portion of the memory in response to a memory request; and
    a control logic capable of:
       transmitting the data from the first portion of the memory to a peer device;
       receiving an acknowledgement from the peer device in response to transmitting the data;
       identifying a second portion of the memory corresponding to data that is successfully received by the peer device wherein the second portion is a subset of the first portion of the memory;
       retrieving new data from the source into the second portion of the memory; and
       transmitting all of the data stored in first portion of the memory to the peer device.

11. The apparatus of claim 10, wherein the control logic is capable of identifying the second portion of the memory based on an acknowledgement received from the peer device, wherein the acknowledgement is indicative of whether the transmission was successful.

12. The apparatus of claim 11, wherein the access controller is a direct memory access controller.

13. The apparatus of claim 11, wherein the source is a memory.

14. The apparatus of claim 11, wherein the memory is a dual-port memory.

15. The apparatus of claim 11, wherein the memory access controller is a direct memory access controller.

16. The apparatus of claim 11, wherein the control logic is capable of determining a starting address of the first portion of the memory for storing data.

17. An article comprising one or more machine-readable storage media containing instructions that when executed enable a processor to:

identify a first portion of a memory for receiving data for transmission to a peer device;

store data in the first portion of the memory;

transmit data from the first portion of the memory to the peer device;

identify a second portion of the memory corresponding to data that is successfully received by the peer device, wherein the second portion is a subset of the first portion of the memory; and retrieve new data from a source into the second portion of the memory.

18. The article of claim 17, wherein the instructions when executed enable the processor to identify a first portion of the memory using mask bits.

19. The article of claim 17, wherein the instructions when executed enable the processor to identify a second portion of the memory based on an acknowledgement received from the peer device, wherein the acknowledgement is indicative of whether the transmission was successful.

20. The article of claim 17, wherein the instructions when executed enable the processor to transmit the data from the first portion of the memory to the peer device over a wireless link.

21. The article of claim 17, wherein the instructions when executed enable the processor to retransmit previously unsuccessfully transmitted data stored in the first portion of the memory and to transmit the data retrieved into the second memory.

* * * * *

UNITED STATES PATENT AND TRADEMARK OFFICE
CERTIFICATE OF CORRECTION

PATENT NO. : 6,560,652 B1
DATED : May 6, 2003
INVENTOR(S) : David N. Larson and Jagannathan Bharath It is certified that error appears in the above-identified patent and that said Letters Patent is hereby corrected as shown below:

<u>Column 9,</u>
Line 27, replace "635*b*requires" with -- 635*b* requires --.

<u>Column 10,</u>
Line 61, replace "buff&er" with -- buffer --.

<u>Column 13,</u>
Line 61, replace "fist" with -- first --.

Signed and Sealed this

Eighteenth Day of November, 2003

JAMES E. ROGAN
*Director of the United States Patent and Trademark Office*